Figure 1:
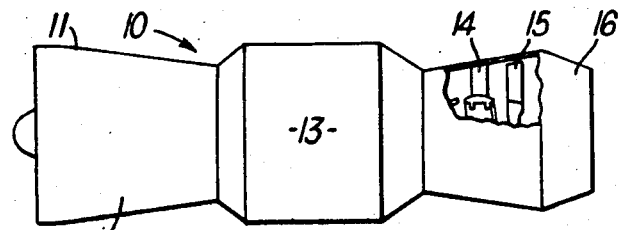
Figure 2:
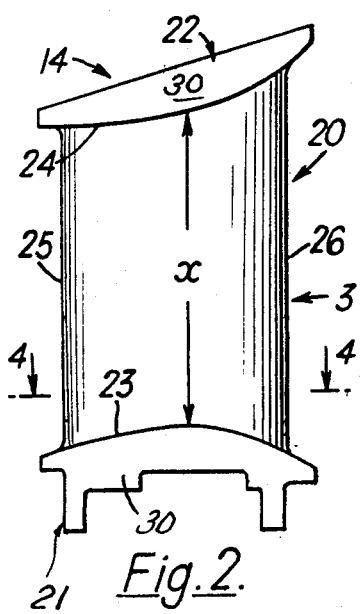
Figure 3:
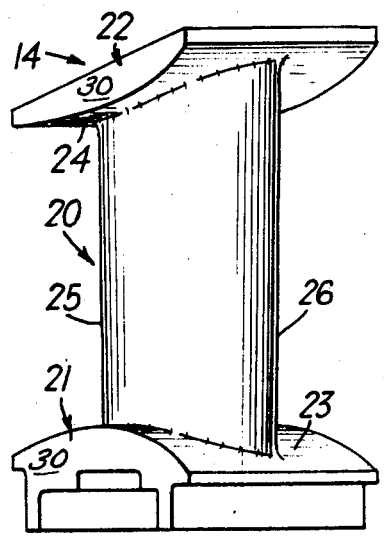
Figure 4:
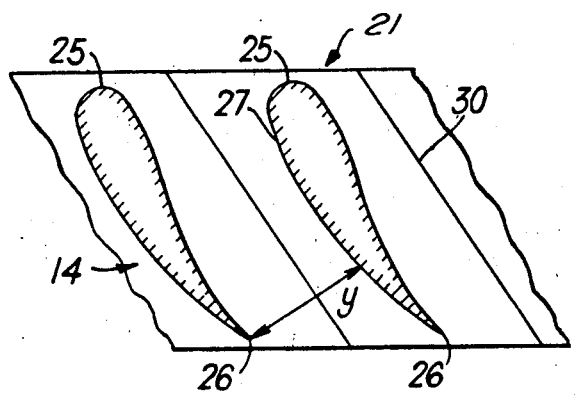

United States Patent

[11] 3,600,780

[72] Inventors Sominick F. Dolce;
Walter G. Poland, both of Sandusky, Ohio
[21] Appl. No. 62,167
[22] Filed Aug. 7, 1970
[45] Patented Aug. 24, 1971
[73] Assignee General Motors Corporation
Detroit, Mich.
Continuation-in-part of application Ser. No.
810,367, Mar. 25, 1969, now abandoned.

[54] METHOD FOR IMPROVING BEARING WEAR
5 Claims, No Drawings
[52] U.S. Cl. ..................................................... 29/148.4 A,
29/148.4 L, 29/149.5 NM, 29/434
[51] Int. Cl. ...................................................... B23p 11/00,
B21d 53/10

[50] Field of Search ............................................ 29/148.4 L,
148.4 A, 149.5 NM, 149.5, 434

[56] References Cited
UNITED STATES PATENTS
3,500,525  3/1970  Glenn .......................... 29/148.4 L

*Primary Examiner*—Thomas H. Eager
*Attorneys*—F. J. Soucek and C. R. Engle

ABSTRACT: A method of improving machine bearing wear wherein components of a rotating bearing assembly are immersed in oil and heated to an approximate temperature of 400° F in an air atmosphere from 60 to 90 minutes. The bearing components are immersed in a hydrocarbon mineral lubricating oil, the excess oil is removed leaving the components coated with an adherent film, and the bearings are then heated to form a varnish film from the adherent film which when placed in an operative environment with normal lubrication provides longer wear characteristics.

Patented Aug. 24, 1971

3,600,780

Inventor
MALCOLM RALPH SCOTT

By
Cushman, Darby & Cushman
Attorneys

METHOD FOR IMPROVING BEARING WEAR

This application is a continuation-in-part of Application Ser. No. 810,367, filed Mar. 25, 1969, now abandoned.

This invention relates to a method of producing an improved bearing assembly whereby longer operational characteristics are obtained. More specifically, this invention relates to a machine bearing having a varnish film formed thereon to provide quieter operation and longer wear attributes.

Heretofore, many attempts have been made to increase wear characteristics of roller and ball bearing assemblies because failure of complex machinery is often traced to a breakdown of these units operating between relatively rotating members. This situation is particularly true where the bearings receive only marginal lubrication. It is therefore the purpose of this invention to provide a method of producing the same which extends the satisfactory operating time of bearing assemblies. This is accomplished by providing an adherent varnish film on the exterior surface of the ball and roller elements as well as upon the associated surfaces of the inner and outer race members.

Therefore, among the objects of this invention is the provision of a relatively simple process wherein a particular varnish film is formed on the exterior surfaces of the bearing components thereby preventing metal-to-metal contact.

A more specific object of this invention is the provision of a process of treating the bearing components with a hydrocarbon mineral lubricating oil to produce the advantageous varnish film.

A further object of this invention is the provision of a process wherein lubricating compound decomposition products form a varnishlike film on the engaging surfaces of the bearings which substantially extends the wear characteristics thereof.

Another object of this invention is the provision of an oil varnish film on bearing surfaces which extends the running time during marginal lubricating conditions while providing substantially quieter operation.

A still further object of this invention is the deposition of a lubricating oil varnish film upon the members of a bearing assembly which appears to be self-rejuvenating during normal operation of the assembly.

Reduction of wear between relatively movable machine components has been an objective since the beginning of the industrial age. One process of forming a hardened wear surface has involved heating machine elements in an oil bath. The subject invention is a further step forward in this area in that it substantially increases the successful operating time of rotatable machine bearing assemblies. This feat is accomplished by taking advantage of the present physical characteristics of bearing components in a simple heat treatment process in an air atmosphere prior to assembly of the bearing.

While it is desirable to machine the surfaces of bearings to a very fine finish, the best surfaces obtainable contain asperities including valleylike microrecesses. Surface failures of bearing assemblies are believed to be attributed in part to the tremendous hydraulic pressures that develop when a lubricating oil enters the aforementioned recesses. The hydraulic pressures frequently exceed the elastic limit of the bearing surface material and failure of the bearing assembly then results. Entrance of the lubricating oil into the surface recesses through the practice of this invention is prevented by applying a varnish film to the bearing surfaces. This film prevents entrance of the lubricating oil into the microrecesses and materially reduces the possibility of metal-to-metal contact thereby providing quieter operation.

The process providing the above-mentioned advantageous features involves immersing the individual bearing components in a hydrocarbon mineral lubricant bath so that the inner and outer race elements and the rolling elements of a roller-type bearing are separately coated. The components are then removed from the bath and the excess oil is wiped off to leave a thin adherent film, prior to placing them in an air atmosphere within a tempering furnace at a temperature of 340° F. to 400° F. for a period of 60 to 90 minutes. The temperature ranges and time periods mentioned in this process are applicable to hydrocarbon mineral lubricating oils, examples of which are Gulf 2205 and Esstic 65 lubricating oils. These oils have the following specifications:

|  | Gulf 2205 | Esstic 65 |
| --- | --- | --- |
| Gravity A.P.I. | 30.5 | 25.6 |
| Viscosity SUS 100° F. | Viscosity | 235628 |
| Viscosity SUS 120° F. | 48.8 | 64 |
| Flash Point C.O.C. | 450° F. | 455° F. |
| Pour Point | +10° F. | 0° F. |
| Color | Light 0.5 | 10.5 Robinson |
| Total Acid No. | Less than 0.03 | Less than 0.10 |

It is apparent that the objective of this process is to subject the adherent film-coated bearing components to a temperature and time period sufficient to decompose the oil so that a varnishlike film is deposited upon the bearing surfaces. Of course, the process is limited to the extent that a minimum temperature used must be sufficient to partially decompose the oil and form the varnish film while a maximum temperature must be below that required to burn or coke the varnished film. While the subject inventive process has been described with respect to the above identified oils, it is appreciated that any lubricating compound, oil, grease or other like material which will partially decompose at a temperature below that used to temper the materials involved, will provide the desirable varnish film allowing the desirable wear improving characteristics.

Initial tests indicate that the utilization of this varnish film substantially increases bearing life as indicated by at least one test wherein bearings completing a 1,000 hour endurance test retained the varnish film on their engaging surfaces. It is not known exactly why the process described herein serves to increase bearing life. It is believed, however, that the varnishlike coating is the partial decomposition product of the lubricant, that is is destroyed to some extent under practical bearing operation, and that within operating conditions of load and temperature the varnish coating is rejuvenated substantially as rapidly as it is destroyed. In any event, the bearing life is greatly increased over the life associated with like bearing operation in the absence of the initial varnishlike film. It is also believed to be desirable to obtain the initial film from the same oil or lubricant that will be used during operation of the bearing assembly. The varnish coating on the balls of a bearing assembly has been measured and found to range in thickness from 0.0014 to 0.0024 inches. Of course, this range of varnish coating thickness will vary with types of lubricating oils used to form the coating and in some applications will be dependent upon the tolerances between the bearing components. A varnish coating thickness in the range of 0.0005 to 0.003 inches appears to encompass these variables. With this relatively thin coating the mating surfaces have been examined subsequent to endurance tests and have found to still contain original grinding marks produced during the manufacture thereof. This fact indicates that little or no wear occurred during these tests.

This process is applicable to bearing assemblies whose components comprise an inner race, an outer race, bearing elements in the form of either rollers or balls and in some instances a cage or separator for the bearing elements. At least the engaging surfaces of the inner and outer races together with the exterior surfaces of the bearing elements are coated in the manner hereinbefore described.

While the above description is directed to a specific process of applying the varnish film to the components of a bearing assembly for process of illustration only, it should be readily appreciated that the advantageous film may be applied in many ways by using various types of lubricating materials.

We claim:
1. The process comprising the following steps:
coating separately the race elements and the rolling elements of a roller-type bearing with a hydrocarbon mineral lubricant;
removing said coating so as to leave a thin adherent film;
baking the elements in the presence of air at a temperature of about 400° F. for about 90 minutes, thereby producing an adherent varnishlike coating having a thickness in the range of 0.0005 to 0.003 inches thereon;
assembling the elements to define a roller-type bearing with the inner and outer races coupled in rolling action by the rollers;
applying a hydrocarbon mineral lubricant to the bearing as a whole; and
working the bearing under load for a prolonged period thereafter, with the varnishlike coating coacting with the last mentioned lubricant to provide greater bearing life than that provided in the absence of the varnishlike coating.

2. The process comprising the following steps:
coating separately the inner and outer race elements and the rolling elements of a roller-type bearing with a hydrocarbon mineral lubricant;
removing the coating to an extent leaving a thin adherent film;
baking the elements in the presence of oxygen at a temperature of about 400° F. for a period of approximately 90 minutes thereby producing thereon an enveloping adherent varnishlike coating having a thickness in the range of 0.0005 to 0.003 inches;
assembling the elements so as to define a roller-type bearing with the inner and outer races coupled in rolling action by the rollers and the otherwise contacting parts being separated by said varnishlike coating;
applying a compatible hydrocarbon mineral lubricant to the bearing as a whole; and
working the bearing under load for a prolonged period thereafter and within the temperature and pressure ranges wherein the varnishlike coating is rejuvenated substantially as rapidly as it is destroyed, whereby the bearing retains substantially its initial-use condition and is characterized by long service life.

3. The process comprising the following steps:
coating separately the inner and outer race elements and the rolling elements of a roller-type bearing with a lubricant;
removing the coating to an extent leaving a thin adherent film;
baking the elements in the presence of oxygen at an elevated temperature and for a time sufficient to produce thereon an enveloping adherent varnishlike coating having a thickness in the range of 0.0005 to 0.003 inches;
assembling the elements so as to define a roller-type bearing with the inner and outer races coupled in rolling action by the rollers and the otherwise contacting parts being separated by said varnishlike coating;
applying a compatible lubricant to the bearing as a whole for lubrication during the operation thereof; and
working the bearing under load for a prolonged period thereafter and within the temperature and pressure ranges wherein the varnishlike coating in association with the compatible lubricant provides greater bearing life than that provided in the absence of the varnishlike coating.

4. The process comprising the following steps:
coating separately the inner and outer race elements and the roller elements of a roller-type bearing with a hydrocarbon mineral lubricant having a Total Acid Number less than 0.10;
removing the coating to an extent leaving a thin adherent film;
baking the elements in the presence of oxygen at a temperature of about 400° F. for a period of approximately 90 minutes thereby producing thereon an enveloping adherent varnishlike coating having a thickness in the range of 0.0014 to 0.0024 inches;
assembling the elements so as to define a roller-type bearing with the inner and outer races coupled in rolling action by the rollers and the otherwise contacting parts being separated by said varnishlike coating;
applying a compatible hydrocarbon mineral lubricant having a Total Acid Number less than 0.10 to lubricate the bearing during operation thereof; and
working the bearing under load for a prolonged period thereafter and within the temperature and pressure ranges wherein the varnishlike coating is rejuvenated substantially as rapidly as it is destroyed, whereby the bearing retains substantially its initial-use condition and is characterized by long service life.

5. The process comprising the following steps:
coating separately the inner and outer race elements and the roller elements of a roller-type bearing with a paraffin-type lubricant having a Total Acid Number less than 0.03;
removing the coating to an extent leaving a thin adherent film;
baking the elements in the presence of oxygen at a temperature of about 400° F for a period of approximately 90 minutes thereby producing thereon an enveloping adherent varnishlike coating having a thickness in the range of 0.0014 to 0.0024 inches;
assembling the elements so as to define a roller-type bearing with the inner and outer races coupled in rolling action by the rollers and the otherwise contacting parts being separated by said varnishlike coating;
applying a compatible paraffin-type lubricant having a Total Acid Number less than 0.03 to lubricate the bearing during operation thereof; and
working the bearing under load for a prolonged period thereafter and within the temperature and pressure ranges wherein the varnishlike coating is rejuvenated substantially as rapidly as it is destroyed, whereby the bearing retains substantially its initial-use condition and is characterized by long service life.

PO-1050
(5/69)

UNITED STATES PATENT OFFICE
CERTIFICATE OF CORRECTION

Patent No. 3,600,780      Dated August 24, 1971

Inventor(s) Dominick F. Dolce and Walter G. Poland

It is certified that error appears in the above-identified patent and that said Letters Patent are hereby corrected as shown below:

On Abstract Page, the inventor's name "Sominick F. Dolce" should read -- Dominick F. Dolce -- .

Column 2, lines 10 through 17, the formula should read --

|  | Gulf 2205 | Esstic 65 |
|---|---|---|
| Gravity A.P.I. | 30.5 | 25.6 |
| Viscosity SUS 100° F | 235 | 628 |
| Viscosity SUS 120° F | 48.8 | 64 |
| Flash Point C.O.C. | 450° F | 455° F |
| Pour Point | +10° F | 0° F |
| Color | Light 0.5 | 10.5 Robinson |
| Total Acid No. | Less than 0.03 | Less than 0.10 |

Column 2, line 42, after "that" delete "is" and substitute -- it -- .

Signed and sealed this 21st day of March 1972.

(SEAL)
Attest:

EDWARD M. FLETCHER, JR.
Attesting Officer

ROBERT GOTTSCHALK
Commissioner of Patents